United States Patent [19]
Bertolini

[11] Patent Number: 4,955,161
[45] Date of Patent: Sep. 11, 1990

[54] CONNECTING DEVICE BETWEEN A WINDOW AND A WINDOW-RAISER ARM IN A VEHICLE DOOR

[75] Inventor: Carlo Bertolini, Paris, France
[73] Assignee: Rockwell-CIM, France
[21] Appl. No.: 410,215
[22] Filed: Sep. 21, 1989
[30] Foreign Application Priority Data
Sep. 26, 1988 [FR] France .................. 88 12541

[51] Int. Cl.⁵ .................................. E05F 11/44
[52] U.S. Cl. ........................ 49/351; 49/727; 49/363; 49/502
[58] Field of Search ............. 49/227, 348–351, 49/363, 502; 160/345, 346

[56] References Cited

U.S. PATENT DOCUMENTS

| | | | |
|---|---|---|---|
| 3,333,622 | 8/1967 | Graber | 160/345 |
| 3,521,317 | 7/1970 | Ford | 160/346 X |
| 3,587,131 | 6/1971 | Graf | 160/345 X |
| 3,888,047 | 6/1975 | Chikaraishi | 49/351 |
| 4,825,594 | 5/1989 | Escaravage | 49/351 |

FOREIGN PATENT DOCUMENTS 3541133 5/1987 Fed. Rep. of Germany ........ 49/351

Primary Examiner—Philip C. Kannan
Assistant Examiner—Jerry Redman

[57] ABSTRACT

This device comprises a section (6) fixed to the lower edge of the window and designed for receiving at least one rolling or sliding roller (5) of the arm (3) of the window; it is characterized by an orifice (8) intended for the introduction of the roller (5) and formed in the section (6), and the latter contains a slideway (9), on which the roller (5) can roll or slide and which is equipped with a pawl (11) for being driven in translational movement by the roller as far as its position closing the orifice (8) for the introduction of the roller (5) and with a pawl (13) for keeping in the assembly position and in the normal position. This arrangement makes it possible to carry out assembly between the window and window raiser automatically by robot.

7 Claims, 5 Drawing Sheets

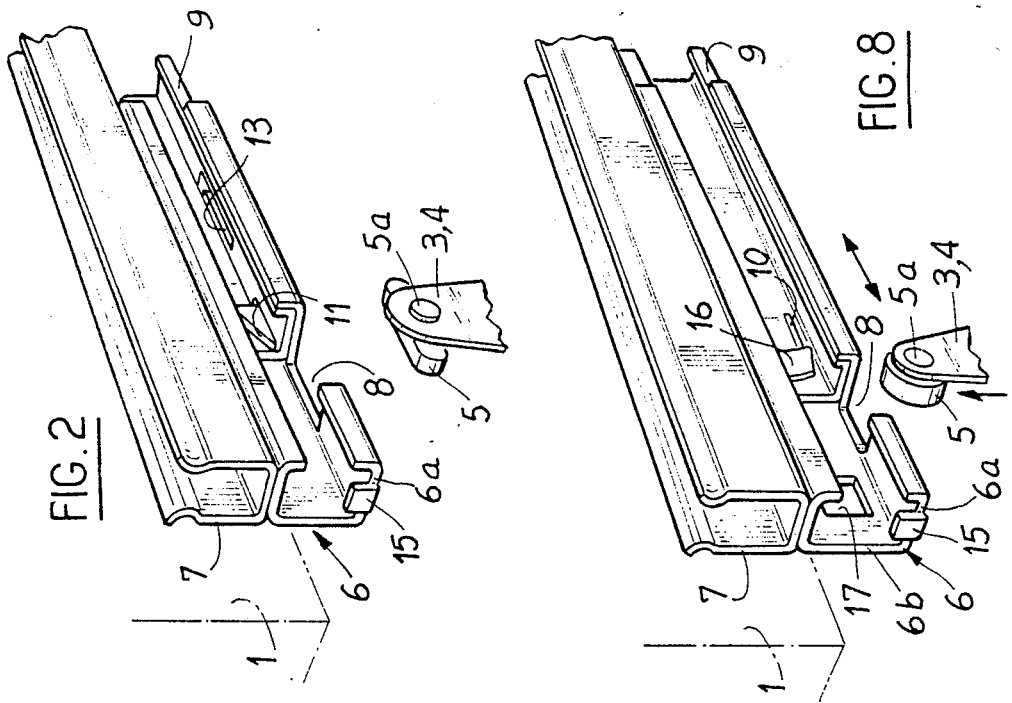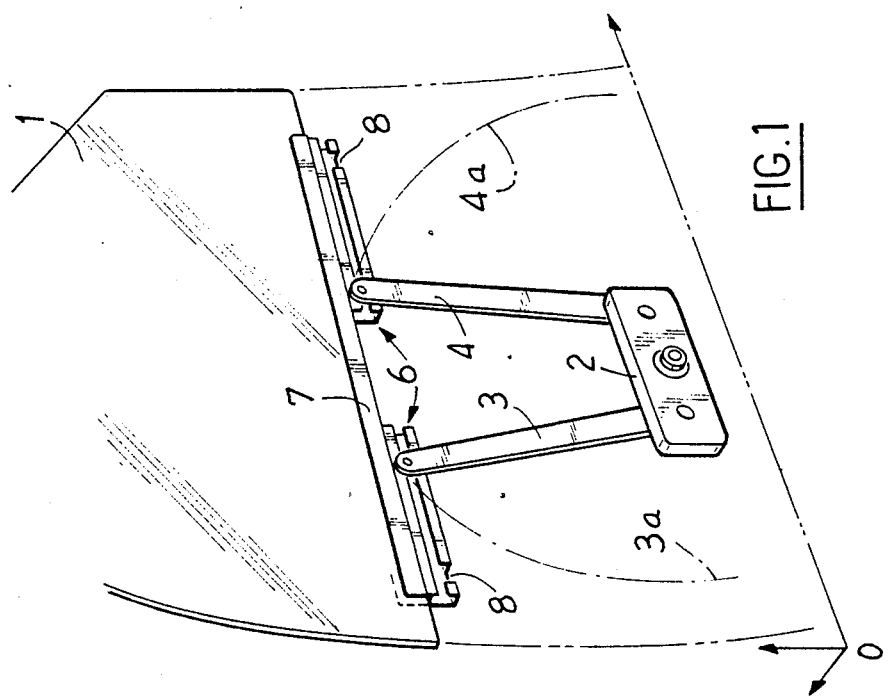

CONNECTING DEVICE BETWEEN A WINDOW AND A WINDOW-RAISER ARM IN A VEHICLE DOOR

The subject of the present invention is a connecting device between a window and a window-raiser arm in a motor-vehicle door, of the type comprising a section fixed to the lower edge of the window and having a rolling or sliding track designed for receiving at least one end roller of the arm.

It is known that some window-raiser mechanisms of motor-vehicle doors comprise at least one arm articulated by means of rollers on the section fixed to the edge of the window, and more specifically on a section fastened to another section having a groove receiving the lower edge of the window.

The window and the arms of the window raiser have hitherto been connected together manually on vehicle assembly lines. Now, within the framework of the progressive automation of assembly lines, the complexity of the movements necessary to execute this assembly work, partially carried out "blind" by the operator, is considered too great for it to be possible for these to be performed by a window-manipulating robot.

The object of the invention is, therefore, to propose a connecting device between the window and the window-raiser arm which is arranged so as to allow them to be assembled together by means of a robot.

According to the invention, the connecting device between a window and a window arm of a vehicle door is characterized in that a passage orifice for the roller is formed in the section, and the latter is equipped with means for the automatic closing of the orifice as a result of the introduction and positioning of the roller in translational movement in the section at the desired location.

According to one embodiment of the invention, the said section is of substantially C-shaped cross-section, the orifice is formed in one branch of this section constituting the rolling or sliding track of the roller, and the said closing means comprise a slideway seated in the section and equipped with elements for locking and for being driven in translational movement by the roller as far as a position in which it covers the orifice in the section.

A section is thus associated with each arm of the window raiser, and these are previously put in an intermediate position between the position in which they are parallel to the said section and one of their end positions, preferably the high position with their rollers located under the orifices in the sections.

Under these conditions, to assemble the window and the window raiser together, it is sufficient for the robot to effect the introduction of the rollers into the corresponding orifices of the section as a result of a vertical translational movement towards the bottom of the window. The robot actuates the window raiser upwards, in such a way that the roller shifts in the section, at the same time snapping onto the slideway. A second actuation of the window raiser in the downward direction causes a shift within the section in the opposite direction, the effect of which is to drive the slideway, which closes the orifice in the section.

Other particular features and advantages of the invention will emerge from the following description made with reference to the accompanying drawings which illustrate two embodiments of it by way of non-limiting examples FIG. 1 is a diagrammatic perspective view of a window raiser of a motor-vehicle door and of a device for connecting its arms to the window, according to the invention.

FIG. 2 is a perspective view of a first embodiment of the connecting device according to the invention.

FIG. 8 is a perspective view, similar to that of FIG. 2, of an alternative embodiment of the invention.

Figure 3:
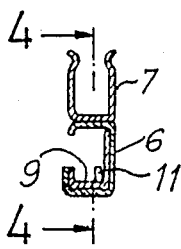
FIG. 3 is a cross-sectional view of the connecting device of FIG. 2.

FIG. 1 shows a window 1 of a door (not shown) of a motor vehicle and a window-raiser mechanism 2, known per se, comprising two swinging arms 3, 4, the ends of which each carry a follower or roller 5 for rolling or sliding (FIG. 2) in a section 6 fastened to a second U-shaped section 7 which receives the bottom of the window 1.

During the raising and lowering of the window 1 after its connection to the arms 3 and 4, the ends of the latter travel along curved paths 3a, 4a represented by dot-and-dash lines in FIG. 1.

The section 6 is of a substantially C-shaped cross-section which is open in order to allow the passage of the axle 5a of the roller 5 and of the end of the corresponding arm 3 or 4, the lower branch 6a of the C delimiting the rolling or sliding track of the roller 5.

An orifice 8 for the introduction of the roller 5 is formed in the section 6, and more specifically in its lower branch 6a. Furthermore, the section 6 is equipped with means for the automatic closing of the orifice 8 as a result of the introduction and positioning of the roller 5 in © translational movement in the section 6 at © the desired location.

Figure 4:
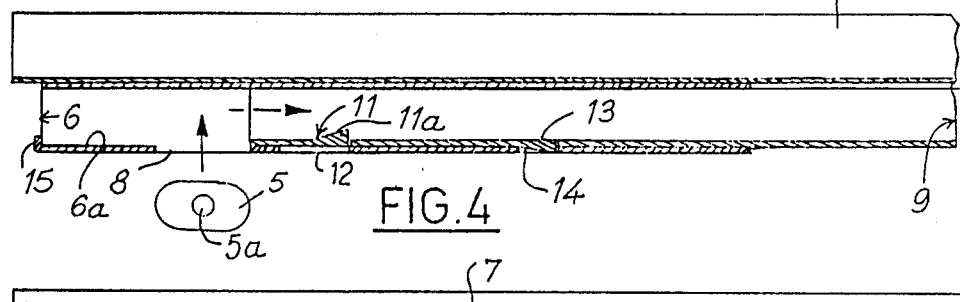
FIG. 4 is a view in longitudinal section according to 4/4 of FIG. 3.

In the embodiment illustrated, these means comprise a slideway 9 which is seated in the section 6 and has, for example, a substantially L-shaped cross-section (FIG. 3) matching that of the section 6 and which can slide in translational movement within the latter. The slideway 9 is equipped with second means or elements for locking and for being driven in translational movement by the roller 5: in the example described, these elements comprise non-return parcels 11 and 15 formed by elastic tongues which are produced integrally with the slideway 9. One end of panel 11 is, at rest, in a position projecting above the surface of the slideway 9 (FIGS. 2 and 4). The pawl 11 can be retracted elastically into a first slot 12 (which with slot 14 defines first locking means) of the section 6 under the pressure of the roller 5, when the latter shifts from left to right, as seen in FIGS. 4 to 7. For this purpose, the end of the pawl 11 has a surface 11a inclined towards the slot 12, so that the shift of the roller 5 on this inclined surface causes the pawl 11 to retract into the slot 12.

Figure 5:
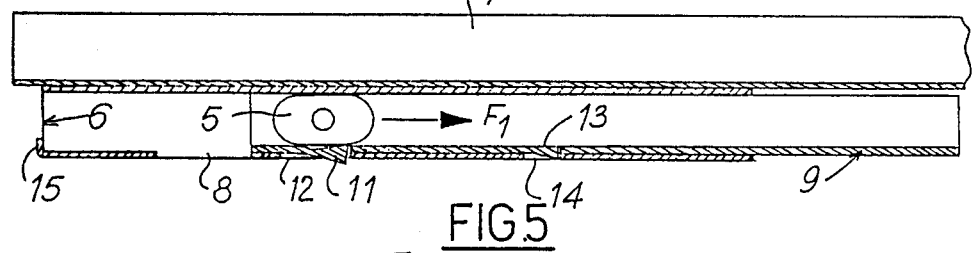
FIGS. 5, 6 and 7 are views similar to that of FIG. 4, illustrating, together with this, a sequence for installing by robot the roller of a window-raiser arm in the section connecting with the window.

The slideway 9 is equipped with a second pawl 13 designed, in its assembly position (FIG. 4), to snap elastically into a second corresponding slot 14 of the section 6, thereby locking the slideway 9 on the section 6 when the slideway 9 is in a position in which it exposes the orifice 8 (FIG. 4). This second pawl 13 butts against the section 6 so as to immobilize the slideway 9 during the horizontal shift of the roller 5 from left to right (FIG. 5). Moreover, this second pawl 13 is capable of assuming its normal position in the slot 12 during the horizontal shift of the roller 5 from right to left (FIG. 7), immobilizing the slideway 9 in the normal position in this fashion the first and second locking means interact to lock slideway 9 in fixed position closing orifice 8.

Figure 7:
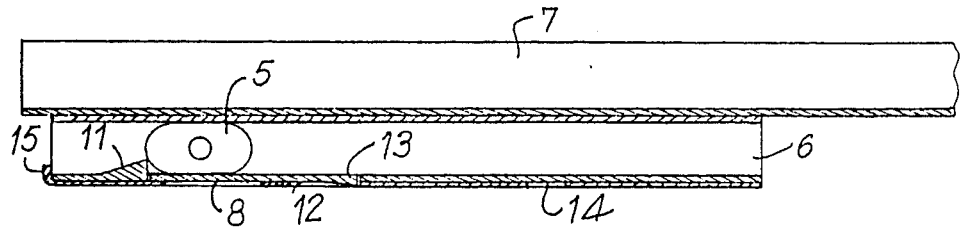

Finally, the section 6 is equipped with an end abutment 15 for stopping the slideway 9 when the latter is at the end of its travel driven by the roller 5 and closes the orifice 8 (FIG. 7). The abutment 15 can be obtained by any suitable means, for example by bending the end of the metal sheet forming the section 6. Fastened under the section 7, for example by welding, are two sections 6 separated by a central gap (FIG. 1), in the vicinity of which the orifices 8 are formed.

The sequence of connecting the arms 3 and 4 of the window raiser and the assembly consisting of the window 1 and the sections 6, 7 is executed as follows by a robot (not shown) carrying the window 1, for example by suction means.

Figure 10:
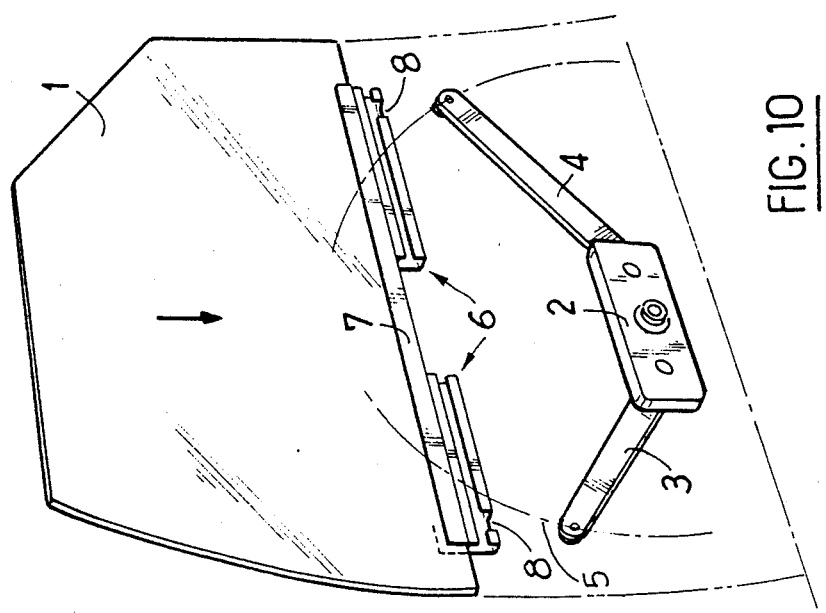

FIGS. 4 and 10: the arms 3, 4 are in their assembly position, intermediate between their horizontal position and their high end position, with their rollers 5 located under the orifices 8. The robot causes the window 1 and the sections 6, 7 to execute a vertical translational movement in the downward direction, which causes the rollers 5 to enter the orifices 8.

Figure 11:
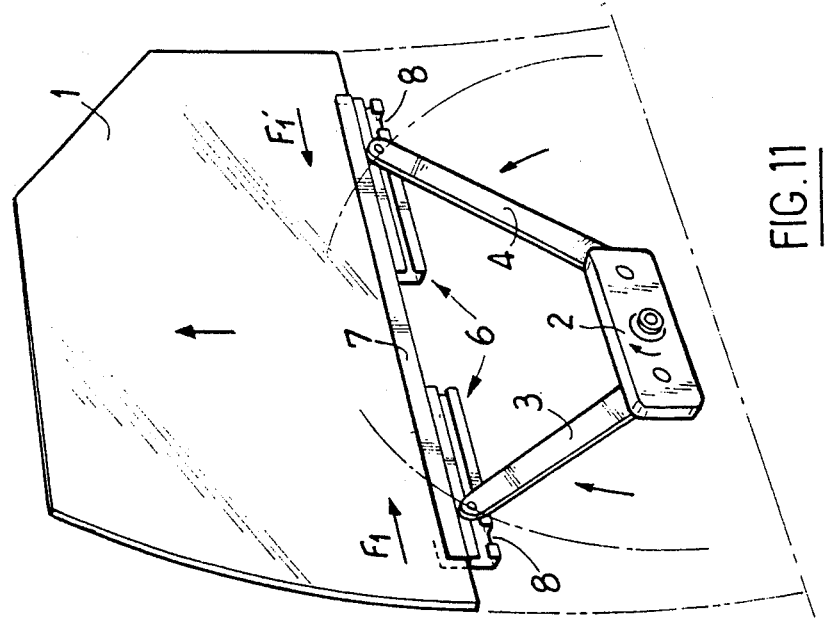
FIGS. 10, 11, 12 and 13 are perspective views similar to that of FIG. 1 and illustrating a sequence for assembling the connecting device according to the invention, corresponding respectively to FIGS. 4 to 7.

FIGS. 5 and 11: the robot causes the window raiser to function in the upward direction. This functioning is obtained either by actuating a manual mechanism (not shown) or by switching on an electric motor (not shown). As a result of this, the rollers 5 execute a horizontal translational movement in sections 6 over the pawls 11 (arrows F1 and F'1). The pawls 11 retract into the slots 12 and then return elastically into their initial projecting position. During this operation, the slideways 9 are kept in position by the pawls 13 projecting in the slots 14 of the section 6.

Figure 6:
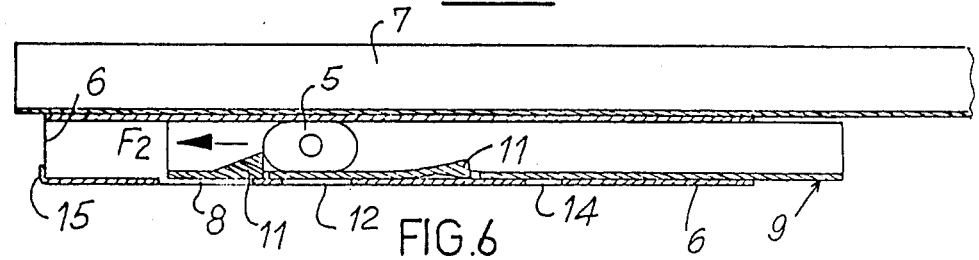
Figure 13:
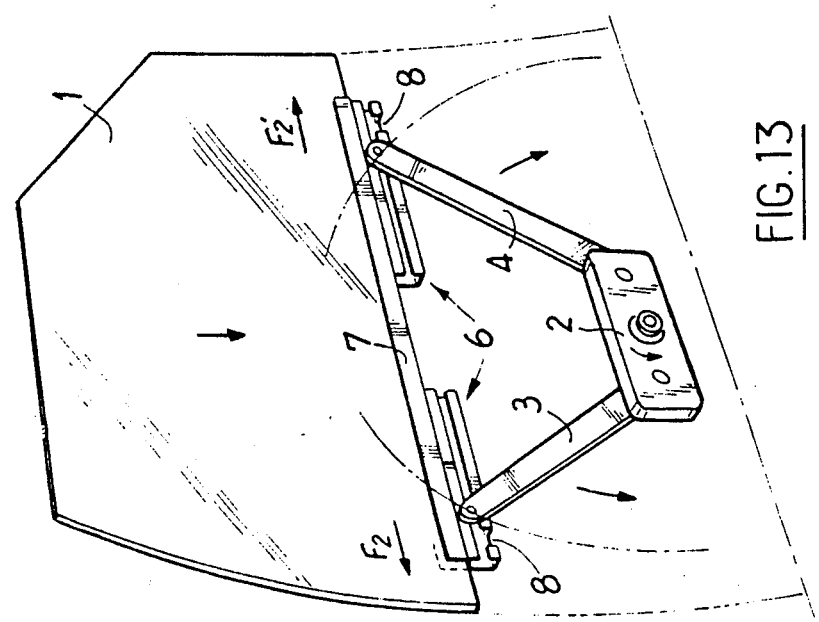

FIGS. 6 and 13: the robot causes the window raiser to execute a downward maneuver, thereby causing the rollers 5 to slide in the direction opposite to the preceding direction (arrows F2 and F'2). Because the rollers 5 bear on the projecting ends, these rollers drive in translational movement the slideways 9 which thereby close the orifices 8, whilst the pawls 13 come out of the slots 14.

Figure 9:
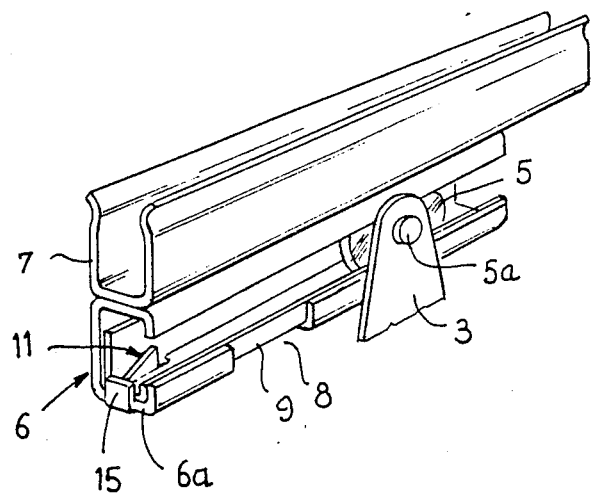
FIG. 9 is a perspective view of the connecting device of FIGS. 2 to 7 after assembly.

FIG. 7: in the vicinity of the horizontal position of the arms 3, 4, which corresponds to the ends of the horizontal travel of the rollers 5, the slideways 9 driven by the rollers 5 are stopped by the abutments 15, whilst the pawls 13 retract elastically into the slots 12. The slideways 9 are then locked in place in the sections 6 by the pawls 13 which drop back into the slots 12, and the window 1 can be actuated by the window raiser 2. FIG. 9 shows the device in its position of use.

In the alternative embodiment of FIG. 8, the pawl 11 is replaced by a pawl 16 located on the vertical side 6b of the section 6 and interacting with slots 10, 17 formed in this same side of the section 6. These slots ensure that the slideway 9 is locked on the section in its two possible positions (FIGS. 5 and 7). Like the pawl 11, the pawl 16 has a slope inclined towards the orifice 8, to allow the roller 5 to shift along. Otherwise, the functioning of this second embodiment is identical to that of the preceding embodiment.

The invention can be used for the window raisers of vehicles comprising a single articulated supporting arm for the window, its roller then shifting in a single associated section 6.

Figure 12:
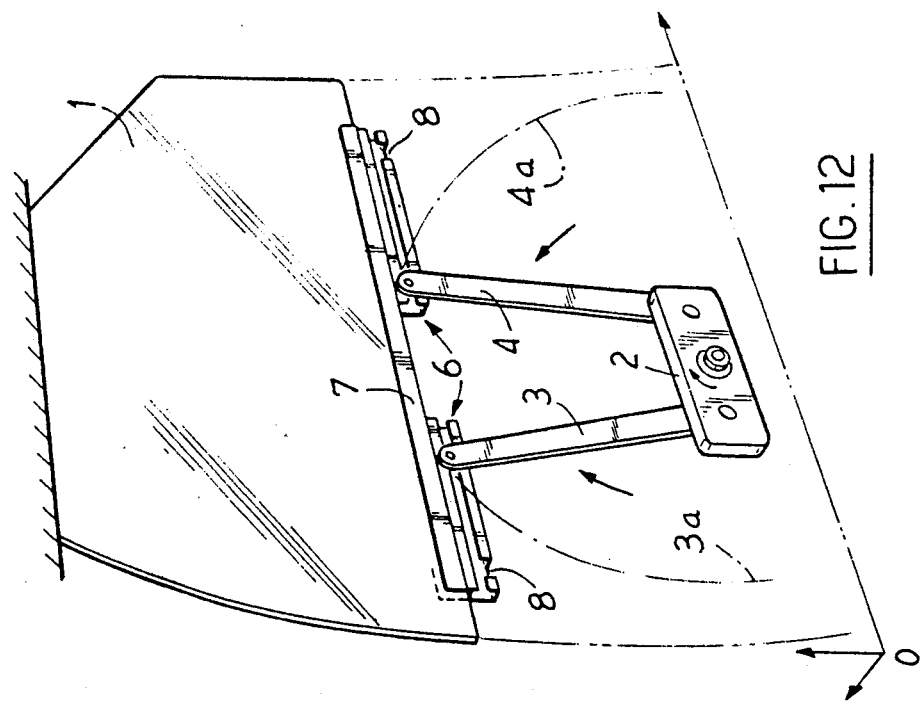

During the installation operation, the window 1 can be brought into its high limiting position, as can be seen in FIG. 12, in order to adjust the seating of the window according to its stops in a completely closed position, by adjusting the fastening means of the window raiser 2 and clamping them in position.

I claim:

1. A connecting device between a window and a window raiser arm (3, 4) of a door in a vehicle, the window raiser arm having a follower element (5) attached thereto, said device comprising: (a) at least one track section (6) fixed to the lower edge of the window; (b) means in said track defining an orifice (8) for introduction of the follower element (5) into said track; (c) first locking means (12, 14) spaced longitudinally apart along the length of said track; and, (d) an elongate slideway (9) disposed with said track, said slideway (9) including second locking means (11, 13), which cooperate with said first locking means (12, 14) to permit a single translational movement of said slideway (9) with respect to said track section (6) by the follower element (5) acting against said second locking means to thereby cause said first and second locking means to interact and lock said slideway in fixed position closing said orifice (8).

2. Device according to claim 1, characterized in that the said section (6) is of substantially C-shaped cross-section, the orifice (8) is formed in one branch (6a) of this section constituting the rolling or sliding track of the follower element (5), and the said closing means comprise a slideway (9) seated in the section and equipped with elements for locking and for being driven in translational movement by the follower element as far as a position in which it covers the orifice (8) in the section (6).

3. Device according to claim 2, characterized in that the said elements comprise a driving pawl (11) which is integral with the slideway and which is produced so as to be retracted elastically into a first slot (12) of the section (6) as a result of a first translational movement of the follower element (5) and then, after the passage of the follower element to rise again automatically into a position projecting relative to the slideway (9), in such a way that a second translational movement of the follower element in the opposite direction to the first translational movement drives the slideway (9) over the orifice (8) in the section (6).

4. Device according to claim 3, characterized in that the slideway (9) is equipped with a second pawl (13) designed to snap elastically either, in the assembly position, into a second corresponding slot (14) of the section (6) or, in the normal position, into the said first slot (12), in order to lock the slideway (9) on the section in one of these two positions.

5. Device according to claim 3, characterized in that the non-return pawl is formed either (11) in the rolling track (6a) of the follower element (5) or (16) in one side (6b) of the slideway (9), in the latter case interacting with complementary slots (10, 17) of the associated side of the section (6).

6. Device according to claim 1, characterized in that the section (6) is equipped with an end abutment (15) for stopping the slideway (9) when, the latter, is at the end of its travel driven by the follower element (5) and closes the orifice (8) of the section.

7. Connecting device between a window and a window-raiser arm (3, 4) of a door in a vehicle, comprising: at least one track section (6) fixed to the lower edge of the window and having a rolling or sliding track designed for receiving at least one end roller (5) of the arm, means in said track section defining an orifice (8) for introduction of the roller (5) into said section (6), the latter being equipped with means for automatic closing the orifice (8) during the introduction and positioning of the roller (5) in translational movement in the section (6) at the desired location, characterized in that said section (6) has a substantially C-shaped cross-section, the orifice (8) is formed in one branch (6a) of this section constituting the rolling or sliding track of the roller (5), and said closing means comprises a slideway (9) seated in the section and equipped with elements for locking and for being driven in translational movement by the roller as far as in a position in which it covers the orifice (8) in the section (6).

* * * * *